Dec. 29, 1964  E. W. PEARSON  3,163,105
PIVOTAL DRIVE CONNECTION
Filed June 11, 1962  3 Sheets-Sheet 1

INVENTOR.
EUGENE W. PEARSON
BY
Bruce & Brosler
HIS ATTORNEYS

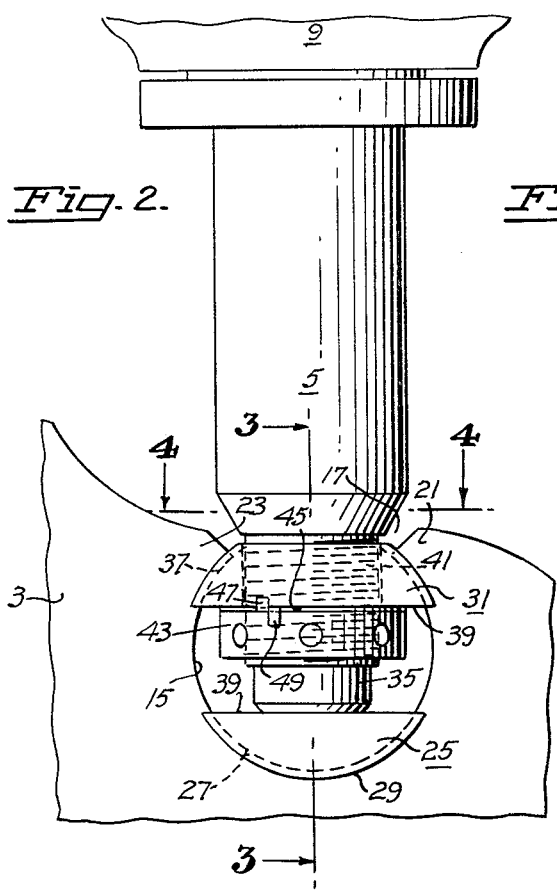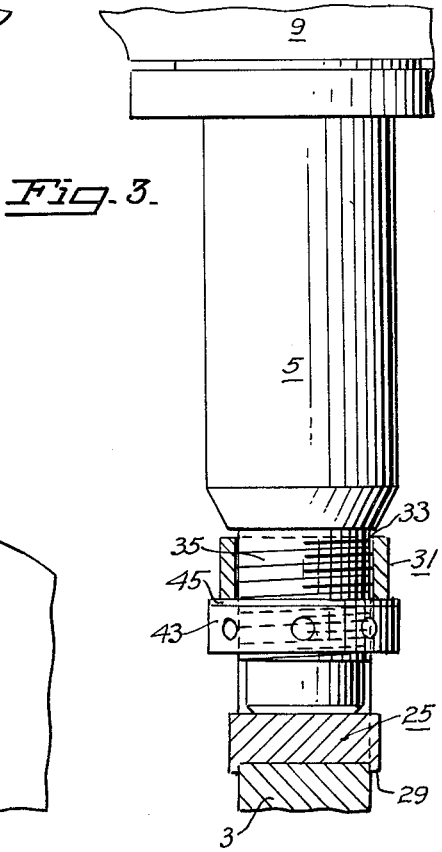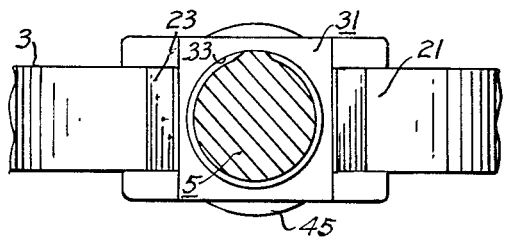

Dec. 29, 1964    E. W. PEARSON    3,163,105
PIVOTAL DRIVE CONNECTION
Filed June 11, 1962    3 Sheets-Sheet 3

INVENTOR.
EUGENE W. PEARSON
BY
Bruce & Brosler
HIS ATTORNEYS

United States Patent Office 3,163,105
Patented Dec. 29, 1964

3,163,105
PIVOTAL DRIVE CONNECTION
Eugene W. Pearson, Orinda, Calif., assignor to Pacific Industrial Manufacturing Co., a corporation of California
Filed June 11, 1962, Ser. No. 201,618
5 Claims. (Cl. 100—214)

My invention relates to pivotal connections, and more particularly to a pivotal drive connection between a drive rod and a driven member.

For purposes of describing the invention, the same will be shown in application to the ram of a machine such as a press brake or shear machine, where the invention solves a problem peculiar to such machines.

Many of such type of machines are provided with leveling means, which react to minor undesired angular diversions of the ram from a fixed relationship to the work, to restore the ram back to the desired relationship.

In many instances, as for example in a shear machine, it becomes desirable to deliberately change the aforementioned relationship in order to realize maximum efficiency, for in a shear machine, the most efficient angle varies with the thickness of the work to be sheared. Following an adjustment of the rake angle of the ram in such machine, the leveling means is relied on to restore the ram back to such angle, should it for some reason tend to depart therefrom.

To permit of such leveling and adjustment of rake angle, necessitates a pivotal drive connection between the ram and its drive means, which customarily involves a drive rod which may be a crank arm in a mechanical drive, or a piston rod in a hydraulically driven machine. Any looseness in such connection, may well stimulate excessive functioning of the leveling means, and upset the otherwise extreme accuracy demanded of such machines.

Among the objects of my invention are:

(1) To provide a novel and improved pivotal drive connection;

(2) To provide a novel and improved pivotal drive connection which is free of looseness or play;

(3) To provide a novel and improved pivotal drive connection which permits of pivotal action without looseness or play in the connection;

(4) To provide a novel and improved drive connection to the ram of a machine such as a press brake or shear machine;

(5) To provide a novel and improved drive connection to the ram of a press brake, shear or like machine, which will not stimulate activity of any leveling means with which such machines may be provided;

(6) To provide a novel and improved drive connection to the ram of a shear machine, which will permit adjustment of the rake angle of the ram of such machine, while maintaining positive pressure engagement between components of the connection throughout each operating cycle of the machine;

(7) To provide a novel and improved pivotal drive connection to the ram of a machine such as a press brake or shear machine, which has a built-in take-up means for wear, and does not require use of shims.

Additional objects of my invention will be brought out in the following description of a preferred embodiment of the same, taken in conjunction with the accompanying drawings, wherein:

FIG. 2 is a fragmentary enlargement of one corner of the ram of the machine of FIG. 1 to bring out details of the invention as applied thereto;

FIG. 3 is a view in section taken in the plane 3—3 of FIG. 2;

FIG. 4 is a view in section taken in the plane 4—4 of FIG. 2;

Figure 1:
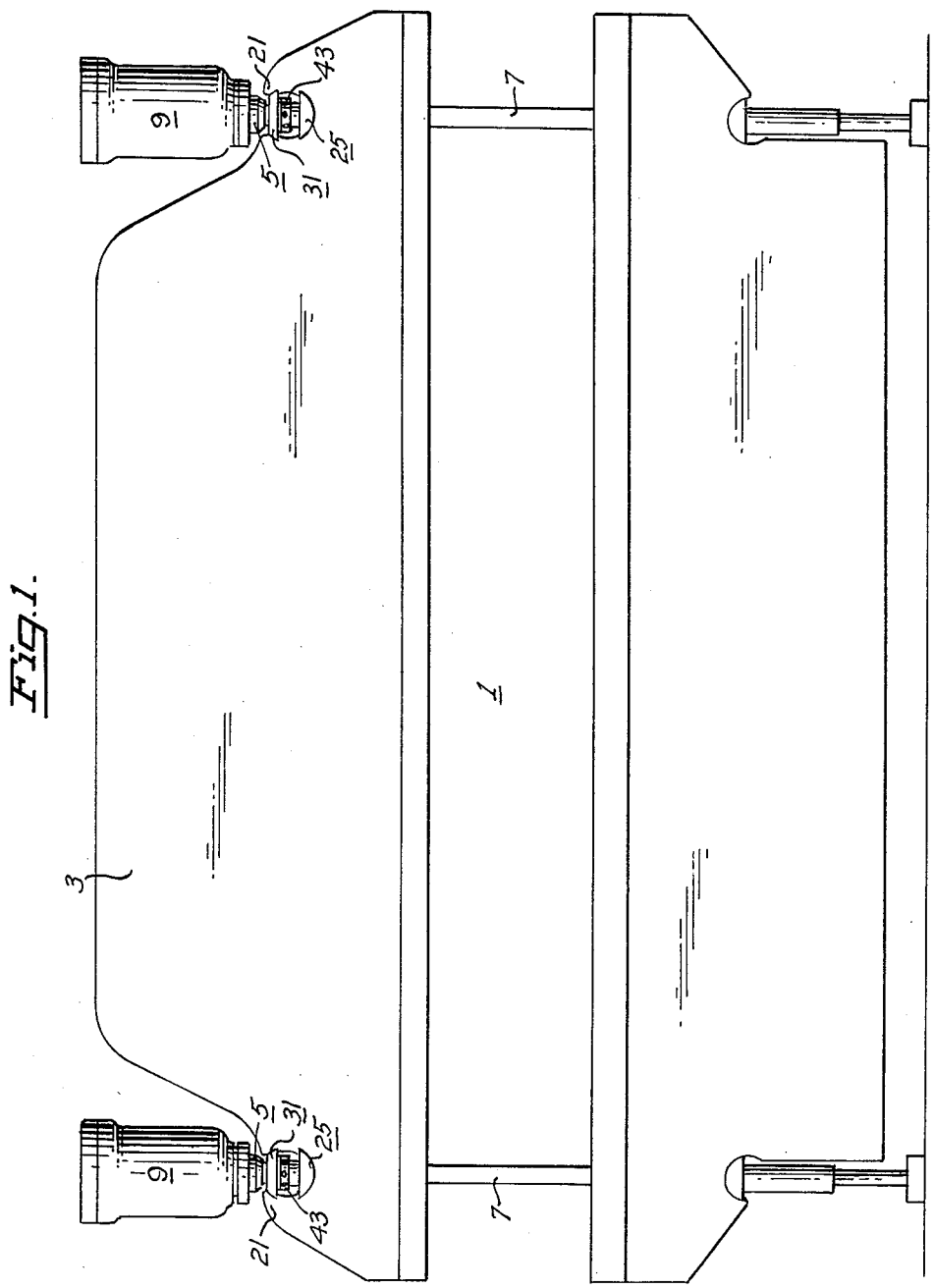
FIG. 1 is a front view in elevation of a machine such as a shear machine, and depicting the application of the present invention thereto.
Figure 5:
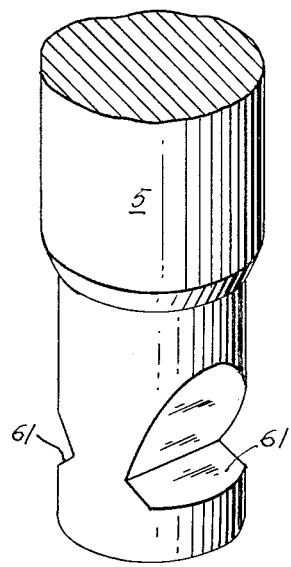
FIG. 5 is a three-dimensional view depicting the piston rod of a modified form of the invention.
Figure 6:
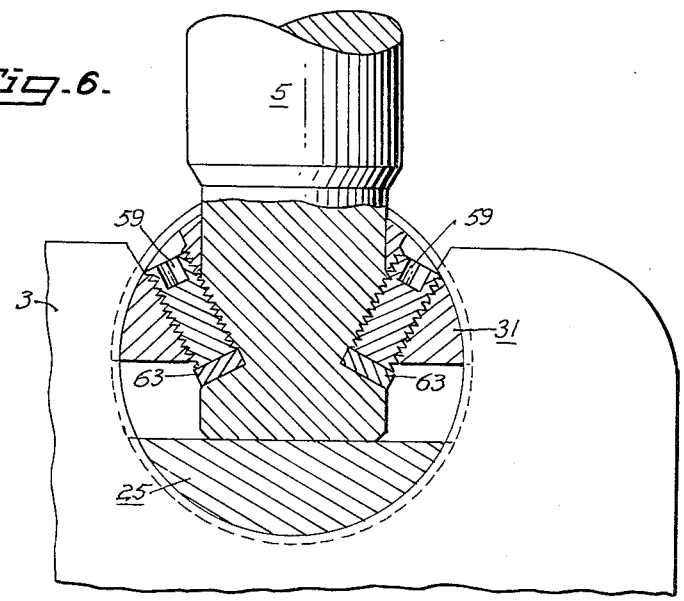
FIG. 6 is a view partly in section, depicting said piston as employed in such modified form of the invention.

Broadly, the pivotal drive connection of the present invention involves a drive rod coupled to a driven member by a pivotal connection incorporating take-up means for maintaining positive pressure engagement between the drive rod and the driven member, while permitting pivotal or angular movement between the driven member and the drive rod.

As applied to a machine 1 of the press brake or shear type, the driven member will be the ram 3 of such machine, while the drive rod will be a piston rod 5, if the machine is hydraulically powered as is the case with the machine depicted in the drawings.

The ram is supported for vertical reciprocal movement along the front edges 7 of the side housings of the machine, by a drive cylinder assembly 9 mounted on each of the side housings above a corner of the ram, of which drive cylinder assembly, the associated piston rod 5 is an included element.

At the line of intended connection of the piston rod to the ram, the ram is provided with a throat-like opening 15 in the upper edge thereof, the opening being circular, and with the entrance 17 thereto facing the drive cylinder assembly, to permit entrance of the piston rod from above.

The throat-like opening thus provided, results in the formation of a horn 21 or similar shaped protuberance adjacent the entrance thereto, which may be stressed to take on the function of stiff spring, while to a lesser degree, the protuberance 23 formed at the opposite side of the entrance can also take on the function of a spring when sufficiently stressed.

Within the lower portion of the circular opening, is disposed a saddle-shaped bearing block 25 adapted to straddle the edge of the ram at that point and provide an arcuate surface 27 having the same radius of curvature as the radius of the opening, to provide a large bearing area, bordered along each side by an arcuate lip 29.

A similar saddle-shaped bearing block 31 provided with a central opening 33 adapted to slidably receive with substantial clearance, the lower end 35 of the piston rod, is adapted to span the entrance to the throat-like opening and engage the edge of the ram to either side of such entrance, with an arcuate bearing surface 37 of like radius of curvature.

Each of the bearing blocks opposite its arcuate bearing surface, is provided with a flat or planar seat 39.

The lower extremity of the piston rod, between the two bearing blocks, is formed with a thread 41 to receive a nut 43, preferably one of the spanner type, which when threaded up the end of the piston rod, will engage the upper bearing block 31, urging it into surface contact with the proximate edge portions of the opening to either side of the entrance of such opening, or in other words, into engagement with the horn 21 and protuberance 23. Thereafter, additional threading of the nut on the piston rod, will produce a reactive force against the rod in a downward direction, causing the piston rod to move downwardly into pressure engagement with the seat of the lower saddle bearing block 25. This not only brings about positive pressure engagement between the piston rod 5 and the ram 3, but in the process, stresses the horn 21, and to a slighter extent, the protuberance 23 across the entrance therefrom, thereby converting the horn in particular, as well as said protuberance, into stiff springs, which will serve and maintain such positive pressure engagement between the piston rod and the ram, while still permitting substantial range of pivotal movement of the ram with respect to the piston rod.

The clearance between the upper bearing block 31 and the piston rod 5, permits the bearing block 31 to accommodate itself to any difference in flexing between the horn 21 and protuberance 23 and this may further be facilitated by slightly arcing the seat 39 of this bearing block.

Suitable locking means may be provided to preclude accidental backtracking of the nut 43, such locking means preferably taking the form of a locking washer 45 between the nut and the upper bearing block. Such washer may be of conventional construction, or one having a pair of tabs 47, 49 extending beyond the confines of the nut and upper bearing block, such that one of the tabs 47 may be bent upward against the proximate wall of the bearing block, while the other tab 49 may be bent downwardly against an adjacent side wall of the nut.

To minimize wear between the bearing blocks and the edges of the ram engaged thereby, such bearing blocks may be provided with grease fittings and suitable grease passages for greasing the bearing surfaces.

It will be apparent from the foregoing description that the horn, and the opposing protuberance to a lesser degree, when stressed in the manner indicated, will effectively create springs therefrom, and as such, will function to maintain positive pressure engagement between the piston rod and the ram throughout each cycle of operation, that is throughout the work stroke and the return stroke of the ram, and further, that such spring action will serve to compensate for a certain amount of wear taking place at the bearing surfaces.

When and if the wear becomes excessive and to a degree that the spring effect is lost and can no longer compensate, the situation can readily be rectified by an adjustment of the nut in the direction of restressing the horn 21 and the protuberance 23 opposite thereto.

The front to back width of the saddles is not critical, and preferably should be such as to permit of some play, to accommodate any slight misalignment between the piston rod and the ram.

While I have disclosed the pivotal connection of my invention in its preferred form, it will be apparent that the same is subject to alteration and modification without departing from the underlying principles involved.

For example, a set screw 59 through the upper bearing block 31 to either side of the piston rod 5, may be so angled as to engage the piston rod, the rod being notched at points of engagement to provide firm pressure points 61. A hardened strip 63 of metal between each set screw and pressure point would minimize wear.

Adjustment of the set screws would bring about positive pressure engagement between the piston rod and the bearing blocks, while stressing the horn and opposing protuberance to maintain such positive pressure relationship through resultant spring action.

Accordingly, I do not desire to be limited in my protecting to the specific details illustrated and described, except as may be necessitated by the appended claims.

I claim:
1. A pivotal drive connection for a ram comprising
a ram having a substantially circular throat-like opening therethrough adjacent each upper corner thereof, to form a horn at each corner and an opposing protuberance,
a saddle adapted to straddle the bottom edge of said throat-like opening and having an arcuate surface to provide a sliding substantially complementary fit therewith,
a drive assembly for each end of said ram,
each said drive assembly including a drive rod for drive engagement with said ram by way of said saddle,
and means including said horn for maintaining said drive rod in positive pressure engagement with said saddle during cycling of said ram.

2. A pivotal drive connection for a ram comprising
a ram having a substantially circular throat-like opening therethrough adjacent each upper corner thereof to form a horn at each corner and an opposing protuberance, adapted to be stressed to function as springs,
a saddle adapted to straddle the bottom edge of said throat-like opening and having an arcuate surface to provide a sliding substantially complementary fit therewith,
a drive assembly for each end of said ram,
each said drive assembly including a hydraulic cylinder,
a piston in said cylinder having a drive rod for drive engagement with said ram by way of said saddle,
and means including said horn for maintaining said drive rod in positive pressure engagement with said saddle during cycling of said ram.

3. A pivotal drive connection for a ram comprising
a ram having a substantially circular throat-like opening therethrough adjacent each upper corner thereof to form a horn at each corner and an opposing protuberance, adapted to be stressed to function as springs,
a saddle adapted to straddle the bottom edge of said throat-like opening and having an arcuate surface to provide a sliding substantially complementary fit therewith,
a drive assembly for each end of said ram,
each said drive assembly including a hydraulic cylinder,
a piston in said cylinder having a drive rod for drive engagement with said ram by way of said saddle,
and means for maintaining said drive rod in positive pressure engagement with said saddle during cycling of said ram, said means including
a second saddle slidably mounted on said drive rod within said throat-like opening and having an arcuate surface adapted to engage the approximate edge of said horn and said protuberance, and
means bearing downwardly against said drive rod and upwardly against said second saddle with sufficient force to stress said horn in effect pressure engagement between said drive rod and said first saddle,
said downwardly bearing means including a thread on said drive rod between said saddles and a nut on said thread adapted to be threaded along said rod to effect movement of said second saddle to its horn stressing position, and
means for locking said nut against undesired movement.

4. A pivotal drive connection for a ram comprising
a ram having a substantially circular throat-like opening therethrough adjacent each upper corner thereof to form a horn at each corner and an opposing protuberance, adapted to be stressed to function as springs,
a saddle adapted to loosely straddle the bottom edge of said throat-like opening having an arcuate surface to provide a sliding substantially complementary fit therewith,
said saddle having a substantially planar seat,
a drive assembly for each end of said ram,
each said drive assembly including a hydraulic cylinder,
a piston in said cylinder having a drive rod for drive engagement with said ram by way of said saddle,
and means for maintaining said drive rod in positive pressure engagement with said saddle during cycling of said ram, said means including
a second saddle slidably mounted on said drive rod within said throat-like opening and having an arcuate surface adapted to engage the approximate edge of said horn and said protuberance, and
means bearing downwardy against said drive rod and upwardly against said second saddle with sufficient force to stress said horn and effect pressure engagement between said drive rod and said first saddle, said downwardly bearing means including a thread on said drive rod between said saddles and a nut on said thread adapted to be threaded along said rod to effect movement of said second saddle to its horn stressing position, and means for locking said nut against undesired movement.

5. A pivotal drive connection for a ram comprising a ram having a substantially circular throat-like opening therethrough adjacent each upper corner thereof, to form a horn at each corner and an opposing protuberance, a drive assembly for each end of said ram, each said drive assembly including a drive rod for drive coupling with said ram, and means including said horn being stressed to constitute a spring for maintaining said drive rod in positive pressure relationship with said ram during cycling of said rod.

References Cited in the file of this patent

UNITED STATES PATENTS

| | | |
|---|---|---|
| 1,739,902 | Hazelton | Dec. 17, 1929 |
| 1,902,038 | McAllister | Mar. 21, 1933 |
| 1,997,672 | Bath | Apr. 16, 1935 |
| 2,254,566 | Cornell | Sept. 2, 1941 |
| 2,302,132 | MacMillin et al. | Nov. 17, 1942 |
| 2,921,807 | McRae | Jan. 19, 1960 |
| 2,980,457 | Page | Apr. 18, 1961 |

FOREIGN PATENTS

| | | |
|---|---|---|
| 449,488 | Great Britain | June 29, 1936 |